Sept. 22, 1953 — W. HAUSZ — 2,653,309
OBJECT DETECTION
Filed March 9, 1950 — 2 Sheets-Sheet 1
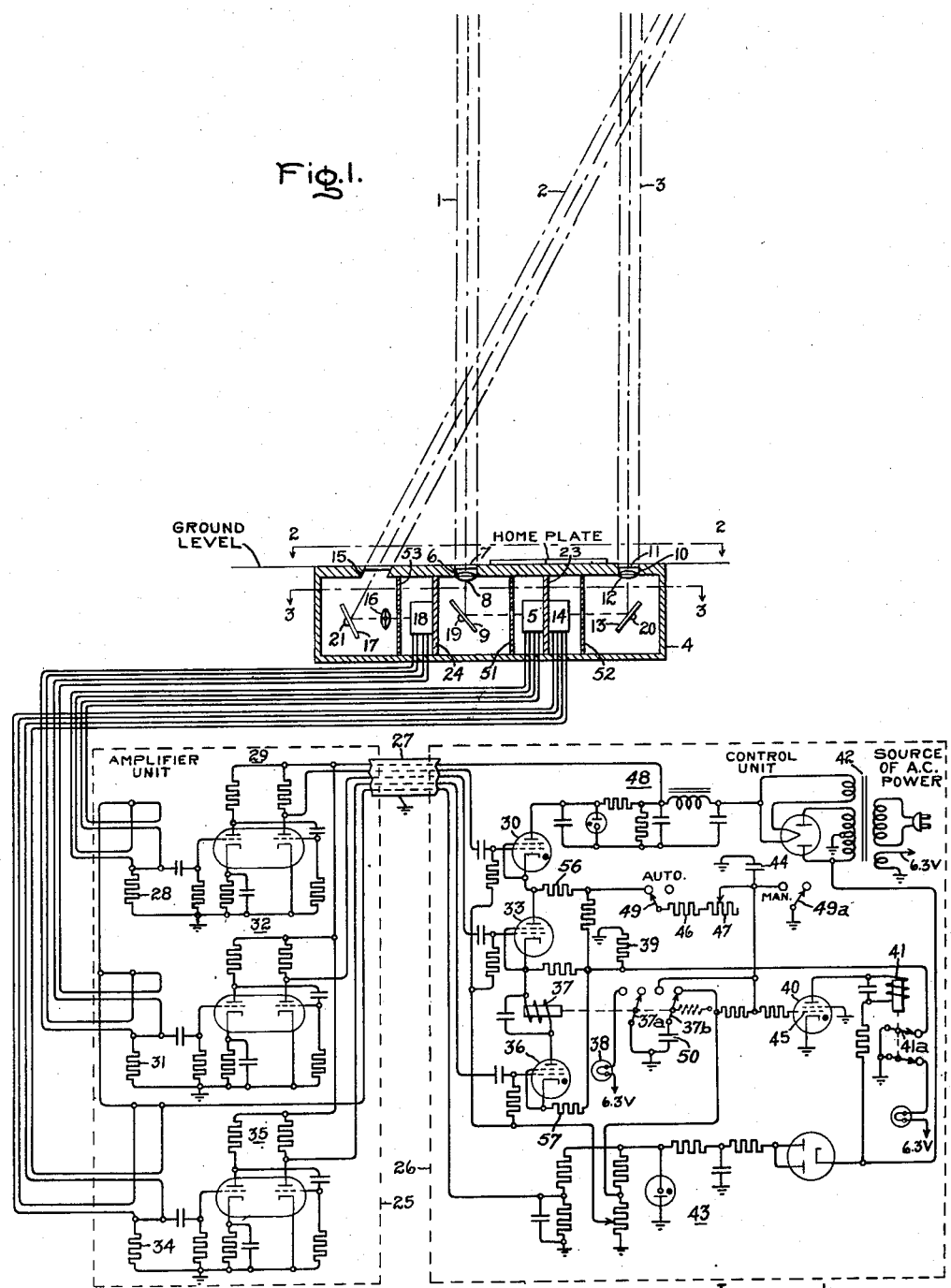
Inventor:
Walter Hausz,
by Merton D Morse
His Attorney.

Sept. 22, 1953     W. HAUSZ     2,653,309
OBJECT DETECTION
Filed March 9, 1950     2 Sheets-Sheet 2
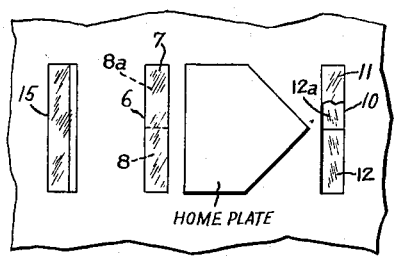
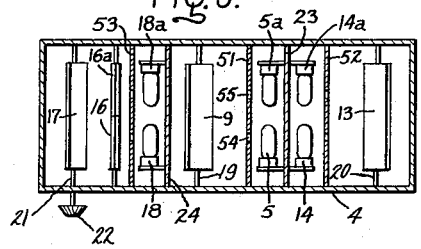
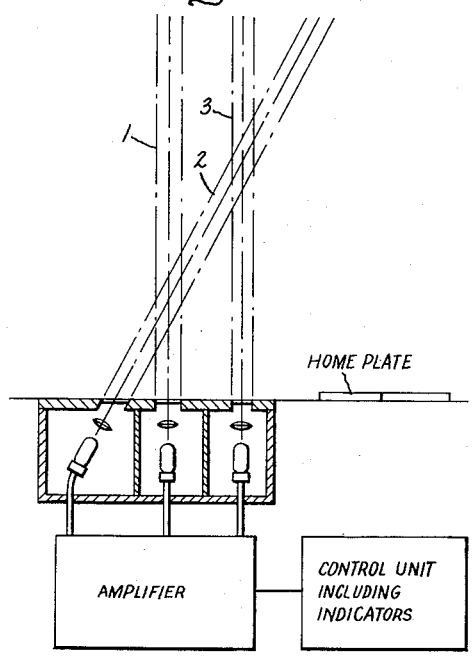
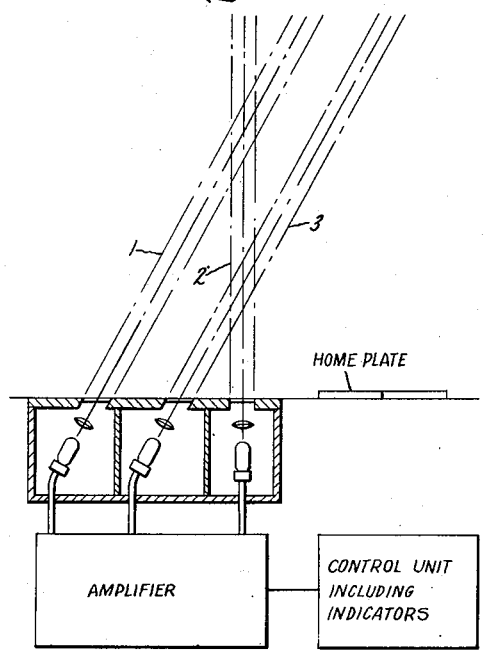
Inventor:
Walter Hausz,
by Merton D. Morse
His Attorney.

Patented Sept. 22, 1953

2,653,309

UNITED STATES PATENT OFFICE 2,653,309

OBJECT DETECTION

Walter Hausz, Syracuse, N. Y., assignor to General Electric Company, a corporation of New York Application March 9, 1950, Serial No. 148,721

15 Claims. (Cl. 340—228)

My invention relates to method and apparatus for the detection of objects and, in particular, my invention relates to method and apparatus utilizing radiation sensitive devices to detect the passage of an object through a particular space defined by the radiation receiving patterns of said radiation sensitive devices.

The invention has particular application to the game of baseball for the purpose of indicating when a "pitched" ball is a "strike." Heretofore, various apparatus have been proposed for utilizing devices sensitive to radiant energy for the purpose of determining when a "pitched" ball is a "strike," for example, the apparatus disclosed in United States Letters Patent 2,113,899—Oram and in United States Letters Patent 2,473,893—Lyle. In the apparatus of the prior art, it has been necessary to locate the components of the apparatus above ground level in the vicinity of the "batter." The location of projecting objects above ground on the playing field is highly objectionable for it presents serious hazards to the "batter" and to the other players.

Accordingly, it is an object of my invention to provide unobstructive apparatus to indicate when a moving object, such as a baseball, passes through a limited volume of space, such as the volume of space vertically above the home plate and between the shoulders and knees of a "batter" in a baseball game.

Another object of my invention is to provide radiation sensitive means for determining when a particular volume of space has been traversed by an object.

A further object of my invention is to provide radiation sensitive apparatus utilizing ambient radiation which will indicate when a particular space is traversed by an object.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a schematic representation of means including the physical arrangement of the apparatus and the associated circuits for carrying out the invention; Fig. 2 is a plan view of the portion of the apparatus of Fig. 1 taken along section line 2—2; Fig. 3 represents a sectional view taken along section line 3—3 showing the location of the radiation sensitive devices, mirrors, irises, and lenses of the apparatus located below ground level in the vicinity of home plate; and Figs. 4 and 5 are alternative arrangements of the radiation receiving patterns or beams of the apparatus of Fig. 1 for carrying out the invention.

One embodiment of my invention, shown in the drawings by way of example, makes use of three sets of phototubes responsive to radiant energy, commonly termed daylight. The tubes are located below ground level in the vicinity of home plate. Each set of the phototubes is arranged so that it is adapted to receive radiation along a narrow beam, or sheet, having a width, generally speaking, equal to the width of home plate. The first beam is located just in front of home plate and extending upward generally perpendicular to the ground. Another beam designated as the third beam is generally parallel to the first beam but is located just behind home plate. Another beam designated as the second beam is located on the same side of home plate as the first beam, but it is farther removed from home plate and is made to intersect the first and third beams at points corresponding to the knees and shoulders, respectively, of the "batter." The phototubes are connected to apparatus responsive to a given sequence of interruption of the radiation receiving patterns of the phototube systems. An indication is produced only when the phototube beams are interrupted in the proper sequence. In the embodiment shown, the proper sequence would be beam 1 first, beam 2 second, and beam 3 last. It is apparent that if a ball is thrown below the knees of the batter, the second beam is interrupted first and consequently there will be no "strike" indication. If the ball is thrown too high, that is, above the shoulders of the batter, the first beam will be interrupted first and the third beam will be interrupted second; hence, again the sequence is improper and no "strike" indication will be produced. Accordingly, only when a ball is thrown through an active zone between the intersection points of beam 2 with beams 1 and 3 will there be any "strike" indication. Furthermore, since the beams are generally speaking only as wide as home plate, a ball thrown "outside" on either side of home plate will not produce any interruption in the beams or cast shadows on the phototubes; consequently, an "outside" ball will produce no "strike" indication. Thus, it is apparent that a strike zone corresponding generally to a volume having a base corresponding to home plate and an altitude corresponding to the distance between the "batter's" knees and shoulders has been "fenced in" by means of intangible beams, or sheets.

Referring now to Fig. 1, there are shown the particularities of the embodiment described in the preceding paragraph for carrying out the invention. The radiation receiving patterns or beams of the radiation responsive means are oriented as shown with respect to home plate. Beam 1 is located in front of home plate. Beam 3 is located behind home plate. Beam 2 is located on the same side of home plate as beam 1 but farther removed from home plate. The width of the beam 1 is made equal to the width of home plate. Beams 2 and 3 may be made wider than the width of home plate to properly indicate "strikes" when "curved" balls which cut, or pass over only, the front corners of home plate are pitched.

The phototubes and associated optical system to produce the above beam arrangement are located in a durable shallow box 4 called a ground unit which is contained below ground level in the vicinity of home plate. Phototubes 5 and 5a receive ambient light or daylight through a slit 6 in the top of the ground unit. The slit 6 is made to have an appreciable depth in order to limit the reception of radiation to a narrow beam. A beam having its narrow dimension about a half inch wide has been found satisfactory. A transparent window 7 is located at the top of the slit 6 to prevent the slit from being filled with dirt. At the bottom of the slit 6 are located lenses 8 and 8a for further confining the reception of radiation to a narrow beam. Any of a variety of lenses may be used. The mirror 9 reflects the ambient light from above through an iris member 51 onto the horizontally located phototubes one of which is indicated at 5 in Fig. 1. These tubes are arranged side by side as shown at 5 and 5a in Fig. 3 as will later be described. The mirror arrangement permits the location of the phototubes in a shallow box 4, as shown. The lenses 8 and 8a and mirror 9 are placed so that the focal points of lenses 8 and 8a are at the location of the iris member 51. Two phototubes with two lenses, one for each tube, are used to obtain a beam having sufficient width. Iris member 51 located at the focal points of the lenses 8 and 8a further limits the reception of radiation by the phototubes 8 and 8a to a narrow beam. The iris member comprises a solid partition with small holes 54 and 55 at the focal points of the lenses 8 and 8a.

The optical system utilizing beam or sheet 3 is similar to the optical system forming beam 1 and comprises a slit 10, a window 11, lenses 12 and 12a, iris member 52, a mirror 13, and phototubes 14. The optical system forming beam 2 is similar to the optical system forming beam 1 except that the slit 15 is diagonally located and the lenses 16 and 16a are located between the mirror 17 and the phototubes 18 and 18a. Iris member 53 is located between the lenses 16 and 16a and the phototubes 18 and 18a. The slit 15 is made diagonal to assist in the production of a diagonal beam. The lenses 16 and 16a are located between the mirror 17 and the phototubes 18 and 18a to facilitate adjustment of the diagonal beam. The width of slits 6, 10, and 15 is made equal the width of home plate, as shown in Fig. 2. It should be understood, however, that slits 2 and 3 may be made wider to take care of the case when a ball that just "cuts" or passes over only a corner of the plate is "pitched."

Fig. 2 shows the arrangement of the slits 6, 10, 15 with respect to home plate.

A sectional view of the ground unit taken along section line 3—3 of Fig. 1 is shown in Fig. 3. The mirrors 9, 13, and 17 are supported from the sides of the box 4 by axial members 19, 20, and 21, respectively. Mirror 17 is made adjustable by means of knob 22 to permit variation of the intersecting regions of beam 2 with beams 1 and 3 to accommodate players of different physical statures. The lenses 16 and 16a are supported at their ends as shown from the sides of the box 4. The phototubes 5, 5a, 14, 14a, 18, and 18a are suitably mounted on partitions 23 and 24 in the box 4, as shown. Two conventional phototubes have been used for each beam in order to obtain a beam sufficiently wide.

Referring again to Fig. 1, an amplifier unit 25 may be located in the ground unit or adjacent the ground unit below ground level to amplify the signals from the phototubes 5, 5a, 14, 14a, 18, and 18a. The control circuits which are responsive to a predetermined sequence of interruption of the beams are located in a control unit 26 away from the playing field. The control unit 26 is connected to the amplifier unit 25 through a cable 27.

The operation of the circuits for indicating a predetermined sequence of interruption of the beams will be explained by considering a specific example. It is assumed that the intersection of beam 2 with beams 1 and 3 corresponds to the height of the "batter's" knees and shoulders, respectively. Let us assume that a "strike" is pitched over home plate. Since ambient light from the sky is falling on each set of the photoelectric discharge devices, the passage of the ball through the strike zone means that beam 1 is interrupted first. The conduction in the first set of photoelectric tubes 5 and 5a is momentarily reduced, and as a result a short positive pulse is produced across the resistor 28. The pulse is applied to the two-stage amplifier 29 which supplies a positive trigger pulse to a thyratron or vapor electric device 30 and causes it to become conductive. Since the anode of this vapor electric device is energized from the unidirectional current source comprising a rectifier 48 this device remains conductive until the anode potential supply is interrupted or reduced to a value insufficient to support conduction. The conductive condition of device 30 applies a positive potential to the anode of the second thyratron 33 and prepares it for triggering. The anode of the second thyratron is connected to the cathode of the first thyratron. The ball next passes through beam 2 causing a positive pulse to be produced across resistor 31. After amplification by a two-stage amplifier 32, the positive pulse is applied to the grid of the second thyratron 33. Since plate potential has been applied to thyratron 33 through the first thyratron 30, thyratron 33 now fires and plate potential is applied through the second thyratron 33 to the third thyratron 36 and readies it for firing. The ball finally passes through beam 3. Interruption of beam 3 will cause a positive pulse to be produced across resistor 34. This positive pulse is amplified by the two-stage amplifier 35, and is applied to the third thyratron 36. Since plate potential has been applied to the thyratron 36, thyratron 36 will fire, that is, it will conduct. Conduction of thyratron 36 will actuate strike indicator light 38 through strike relay 37 and switch 37a.

The resetting of the thyratrons 30, 33, 36, that is returning them to their initial condition, for the next pitched ball is achieved by momentarily connecting either automatically or manually a high resistance 39 in the cathode circuits of the thyratrons 30, 33, 36. The switching of the high resistance 39 is accomplished by means of a reset thyratron 40 and a reset relay 41, including switch 41a, which is connected in the output circuit of the thyratron 40. The output circuit of the thyratron 40 is energized by a source of alternating current potential comprising a transformer 42. The input circuit of the thyratron 40 is kept at a negative bias by a source 43 of negative bias and is triggered only when the charge accumulated on a capacitor 44 has raised the voltage of the grid 45 to a point at which the thyratron 40 becomes conductive or fires. The voltage on the capacitor 44 starts to build up when the first thyratron 30 is caused to fire. The time after the first thyratron 30 fires at which the reset thyratron 40 fires can be made any value depending upon the choice of circuit constants, particularly the value to which capacitor 44 was initially charged from bias source 43, the pulse appearing in the cathode circuit of thyratron 30 and the values of resistors 46, 47 and capacitor 44. For the operation being described, it has been found satisfactory to make the time delay in firing the reset thyratron 40 approximately one-tenth of a second; that is, one-tenth of a second after the first thyratron 30 fires, the reset thyratron 40 will be fired unless the second thyratron 33 and third thyratron 36 have also been fired before the one-tenth of a second has elapsed. In the event that all three thyratrons 30, 33, 36 have been fired and a "strike" registered it may be desirable to delay the reset operation to a longer time than one tenth of a second in order, for instance, to permit a reading of the strike indication. This may be accomplished by switching a large capacitor 50 in parallel with capacitor 44 through switch 37b upon actuation of strike relay 37. This operation increases the time required for the grid of thyratron 40 to reach firing potential. If in addition capacitor 50 had previously been charged to a high negative potential the time may be still further increased. After a strike indication a delay of about five seconds of the reset has been found quite satisfactory.

Assume that the first thyratron 30 only has been fired. Then after one-tenth of a second, the reset thyratron 40 will be actuated causing the reset relay to switch the high resistance 39 into the cathode circuit of the first thyratron 30 and readying the thyratron 30 for a new indication. Thyratron 40 is not reset instantaneously. A reset time of about one-tenth of a second has been found satisfactory. The factors determining the reset time will become apparent by a consideration of the circuit operation after reset relay 41 has switched a high resistance 39 into the cathode circuit of thyratron 30. The cathode of thyratron 30 drops back to zero potential and capacitor 44 starts to discharge. The discharge rate is determined by resistors 46, 47, the cathode resistors of thyratrons 30, 33, and 36, and also the resistor in the grid circuit of thyratrons 40 since thyratron 40 being fired constitutes a low resistance path. It will be recalled that the plate of thyratron 40 is supplied with an alternating potential, consequently when the grid bias of thyratron 40 reaches a certain value, thyratron 40 is extinguished causing reset relay 41 to drop out thus completing the reset cycle. The time of reset may be varied within wide limits by varying the above factors. Recapitulating for the situation in which only thyratron 30 has fired, thyratron 40 is caused to fire one-tenth of a second after thyratron 30 fires and thyratron 40 is extinguished one-tenth of a second after it fires. The above times may be varied by the choice of appropriate circuit constants.

Assume now that the first, second and third thyratrons 30, 33, 36 have been fired, the second and third thyratrons 33, 36 having been fired within one-tenth of a second after the first thyratron 30 has been fired. The relay 37 will actuate the switch 37a causing the indicator 38 to show a strike. After about five seconds determined by the magnitude of capacitor 50 and the value to which it has been charged, have elapsed the voltage on the grid 45 of the thyratron 40 will have been increased to a value at which the thyratron fires causing the reset relay 41 to actuate the switch 41a to extinguish the thyratrons 30, 33, 36 in the manner described above. Once the source of energy for charging the capacitor 44 is disconnected by, in effect, opening up the cathode circuit of the thyratron 30, the negative bias voltage on the grid of the thyratron takes over and, as the plate of the reset thyratron 40 goes through zero potential, the thyratron 40 is extinguished. The relay 41 is deactivated, and the switch 41a returns the cathode circuits of thyratrons 30, 33, 36 to their original state ready for the next cycle of operation.

The factors determining the desirable values of the duration of the delayed firing of thyratron 40 will appear from the following example. If minimum speed of the baseball it is desired to catch is, for example, 40 ft. per second and the beam spacing is 2 ft. the longest time of traverse of beams 1 and 3 by the baseball will be .05 of a second. If the reset operation time is of this order of magnitude the device will reset too fast to indicate slow balls. On the other hand if it takes too long to reset them a batter can operate the device with his swing. A little under one-tenth of a second has been found best. One advantage in having the reset thyratron 40 triggered approximately one-tenth of a second after the first thyratron 30 is fired and having the reset cycle completed after another tenth of a second is to render the apparatus non-responsive to practice swings. For instance, if a "batter" takes a practice swing, the beams will be interrupted in improper sequence and only the first thyratron section will be triggered resulting in no "strike" indication. If the "batter" now draws his bat back through the strike zone while the reset thyratron is fired, then no "strike" indication will be produced. That is, the apparatus has not been completely reset for an indication; consequently, no indication will be obtained. If the batter draws his bat back within less than one-tenth of a second after triggering the first thyratron 30, then, of course, there will be a "strike" indication. But this is rather unlikely in view of the fact that the batter would have to draw the bat back practically instantaneously in order to get a strike indication. At any rate, the time constant comprising capacitor 44 and resistors 46, 47 may be changed to accommodate for this condition.

In order to manually reset the apparatus, switch 49 is initially set in manual position disconnecting resistors 46 and 47 from operative association with the apparatus. The resetting of the thyratrons 30, 33, 36 is achieved by momentarily connecting the grid 45 of reset thyratron 40 to ground through switch 49a. The remainder of the resetting cycle is similar to the resetting cycle on automatic operation described above.

Power supply 48 supplies plate potential to the amplifier stages 29, 32, 35 and to the thyratrons 30, 33, 36. Power supply 43 supplies bias potentials for the phototube circuits for the thyratrons 30, 33, 36 and for the reset thyratron 40.

Other sequence responsive circuits may be used in place of the thyratron arrangement described, for example circuits employing multivibrators of the one-shot variety may be devised to respond to a particular sequence. With the circuit shown in the drawings satisfactory results have been obtained using the following circuit constants:

| | |
|---|---|
| Phototubes | Type 1P29 |
| Amplifier tubes | Type 12Ax7 |
| Thyratron tubes | Type 2D21 |
| Resistors 28, 31, and 34 | 3.3 megohms each |
| Resistor 39 | 1 megohm |
| Resistor 46 | 5.6 megohms |
| Resistor 47 | 5 megohms |
| Capacitor 44 | 1 microfarad |
| Capacitor 50 | 2 microfarads |
| Maximum plate voltage | 300 volts |
| Maximum negative bias | 105 volts |

Referring now to Figs. 4 and 5, there are shown alternative beam arrangements for carrying out the invention. In Fig. 4 is shown a beam arrangement similar to the beam arrangement of Fig. 1 except that all the beams are located in front of home plate. The apparatus of Fig. 4 otherwise is similar to the apparatus of Fig. 1. In Fig. 5 is shown a beam arrangement comprising two slant beams and one vertical beam all of which are located in front of home plate. With this arrangement variation of the strike zone for different players may be accomplished by slanting the vertical beam 2 to vary the intersection of this beam with beams 1 and 3. Individual variation of knee and shoulder limits may also be obtained by moving each slant beam. The apparatus independently of Fig. 5 otherwise is similar to the apparatus of Fig. 1.

In Figs. 1, 4 and 5, it is apparent that the beams may be moved individually or together to vary the strike zone. While in connection with Figs. 1, 4 and 5 various beam arrangements have been shown utilizing devices responsive to radiant energy, it is apparent that transducers may be utilized other than those responsive to radiant energy, for instance supersonic transducers and high frequency electromagnetic transducers. With the latter kinds of transducer, of course, it would be necessary to suitably supply a source of supersonic or high frequency energy.

The apparatus of Fig. 1 may be used with conventional timing circuits to indicate the speed of an object, such as a baseball, as well as indicate that the object has passed through a particular zone. When a "strike" is pitched, the interruption of beams 1 and 3 causes the voltage across resistor 56 and resistor 57 to change. The separation in time of these voltage changes represents the time it took for the baseball to pass between the beams 1 and 3. Since the distance of separation of beams 1 and 3 is fixed, the above referred to time is inversely proportional to the speed of the baseball. The voltage changes across resistors 56 and 57 may be used to trigger a multivibrator of the "flip-flop" variety, that is, a multivibrator having two stable states. The width of the pulse obtained from the multivibrator could then be used to charge a capacitor. The voltage across the latter capacitor would be a measure of the pulse width and also of the time of passage of the baseball between beams 1 and 3. A peak reading voltmeter connected to the capacitor and calibrated in terms of speed would give a direct reading of the speed of the baseball.

While I have shown a particular embodiment of my invention, it will of course be understood that I do not wish to be limited thereto since many modifications, both in the circuit arrangement and in the instrumentalities employed, may be made, and I therefore contemplate by the appended claims to cover any such modifications as fall within the true spirit and scope of my invention.

What I claim as new and desire to secure by Letters Patent of the United States is:

1. The combination, in a system for detecting the passage of an object through a volume of space, of a plurality of light responsive means, two of said light responsive means being arranged to respond to interruption of respective sheets of light defining different surfaces of said volume of space, and a third of said means being responsive to interruption of a third sheet of light intersecting said first sheets along lines lying in other surfaces of said space, and means controlled by said light responsive means to operate in accordance with the sequence of interruption of said sheets.

2. The combination, in a system for detecting the passage of an object through a volume of space, of a plurality of light responsive means, two of said light responsive means being arranged to respond to interruption of respective sheets of light defining different surfaces of said volume of space, and a third of said means being responsive to interruption of a third sheet of light intersecting said first sheets along lines lying in other surfaces of said space, and means controlled by said light responsive means to produce a predetermined operation in response to interruption of said beams in one sequence, said last means being unresponsive to interruption of said sheets in different sequence to produce said operation.

3. The combination, in a system for detecting the passage of an object through a volume of space, of a plurality of light responsive means, two of said light responsive means being arranged to respond to interruption of respective sheets of light defining different surfaces of said volume of space, and a third of said means being responsive to interruption of a third sheet of light intersecting said first sheets along lines lying in other surfaces of said space, whereby an object traversing said space interrupts said sheets in one sequence and in passing through said sheets in the same direction but beyond said space interrupts said sheets in a different sequence, and means to operate in response to interruption of said sheets only in a desired predetermined sequence.

4. The combination, in a system for detecting the passage of an object through a region of space, of two light responsive means, each of said light responsive means being arranged to respond to the interruption of a respective sheet of light, said two sheets of light defining different surfaces of said region of space, said light responsive means being further arranged such that said sheets intersect to form two diverging beams on opposite sides of the intersection, said intersection defining the boundary between two sides of said region, whereby an object traversing said region on one side of said boundary interrupts said sheets in one sequence and in passing through said region in the same direction but on the other side of said boundary interrupts said sheets in a different sequence, and means to operate in response to interruption of said sheets only in a desired predetermined sequence.

5. An object detecting system having beam means for creating an active zone comprising a first radiation sensitive device responsive to radiation along a narrow beam, a second radiation sensitive device responsive to radiation along a narrow beam displaced from said first beam, a third radiation responsive device responsive to radiation along a narrow beam, said third beam intersecting said first and second beams to form said active zone having a width corresponding to the width of said beams and a length corresponding to the distance of separation of said intersections, means connected to said radiation sensitive devices responsive to a predetermined sequence of interruption of said beams corresponding to the passage of an object through said active zone.

6. An object detecting system having beam means for creating an active zone comprising a first radiation sensitive device responsive to radiation along a narrow beam, a second radiation sensitive device responsive to radiation along a narrow beam displaced from said first beam, a third radiation responsive device responsive to radiation along a narrow beam, said third beam intersecting said first and second beams to form said active zone having a width corresponding to the width of said beams and a length corresponding to the distance of separation of said intersections, means connected to said radiation sensitive devices responsive to a predetermined sequence of interruption of said beams corresponding to the passage of an object through said active zone, means connected to said radiation sensitive devices for indicating the speed of passage of said object between said first and second beams.

7. An object detecting system for determining the passage of an object through an active zone comprising a first radiation sensitive device responsive to radiation along a narrow beam, a second radiation sensitive device responsive to radiation along a narrow beam, said second radiation sensitive device located so that said beams have projected components generally parallel to each other, a third radiation sensitive device responsive to radiation along a narrow beam, said third radiation sensitive device located so that said third beam intersects said first and second beams, said lines of intersection of said beams forming part of the boundary of said active zone, control means connected to said radiation sensitive devices and responsive to a predetermined sequence of interruption of said beams corresponding to the passage of said object through said active zone.

8. Apparatus for the detection of objects comprising means for creating an active zone, said means including a first, second and third transducer having narrow beam responsive regions, one of said beam responsive regions intersecting the other two beam responsive regions to define said active zone, control means connected to said transducer and responsive to a predetermined sequence of interruption of said regions corresponding to the passage of said object through said active zone in a predetermined direction.

9. Apparatus for the detection of the passage of an object on a predetermined side of a region comprising means for creating said region, said means including a first and second transducer each responsive only to radiation along a respective narrow beam, said transducers being arranged in a manner such that said beams of said transducers intersect to form two diverging beams on opposite sides of the intersection, said intersection dividing said region, means connected to said transducers and responsive to a predetermined sequence of interruption of said beams corresponding to the passage of said object on said predetermined side of said region.

10. Apparatus for indicating a pitched ball as a strike in a baseball game, comprising in combination with home plate, means for creating an active zone above said home plate having a horizontal width substantially the same as the width of said plate and of a vertical height substantially the same as the distance between the shoulders and knees of the batter, said means including a first transducer having a narrow beam responsive region of the width of said home plate and which is generally vertically located in front of said plate, a second transducer having a narrow beam responsive region which is generally vertically located in front of said home plate between said first transducer and said plate, a third transducer having a narrow beam responsive region which is generally vertically located in front of said plate between said second transducer and said plate, said transducers arranged so that one of said beams intersects the other two beams at levels corresponding to the knees and shoulders of said batter, means for varying the levels of intersection, indicating means responsive to a predetermined sequence of interruption of said beams corresponding to the passage of said baseball through said active zone.

11. Apparatus of claim 10 in which said home plate lies between the beams from said second and third transducers and in which said first beam is inclined to intersect said beams from said second and third transducers.

12. The apparatus of claim 10 in which said second and third beams are located in front of said first beam and inclined at angles with said first beam to intersect said first beam at levels corresponding to knee level and shoulder level respectively of said batter.

13. A system for indicating when a pitched ball in a game of baseball passes through the strike zone over home plate for a given player comprising a first radiation sensitive device adapted to receive radiation through a narrow slit having a width equal to the width of home plate and located parallel to the front edge of and a short distance in front of said home plate, a second radiation device adapted to receive radiation through a narrow slit located a short distance behind said home plate, a third radiation sensitive device adapted to respond to radiation received through a narrow slit and located a short distance in front of said first slit, said radiation responsive devices all located below ground level, said radiation sensitive devices and said slits so arranged that said first and second radiation sensitive devices respond to radiation coming from a substantially vertical direction, said third radiation sensitive device and slit so arranged and adapted to receive radiation along a direction inclined to and intersecting the first and second directions in lines corresponding to the knee and shoulder level of said strike zone, means responsive to a one-three-two sequence of interruption of said radiation to said radiation sensitive devices corresponding to the passage of a ball through said strike zone, said second and third beams being of a width equal to or greater than the width of the beam of the first radiation sensitive device.

14. A system for automatically indicating when a pitched ball in a game of baseball passes through the strike zone over home plate for a given player comprising a first photoelectric device provided with an optical system adapted to focus on said photoelectric device ambient radiation received through a narrow slit having a width equal to the width of said home plate and located at ground level parallel to the front edge of and a short distance in front of home plate, said optical system and said photoelectric device located below ground level, said optical system adapted to focus radiation on said photoelectric device striking said slit in a direction substantially perpendicular to the ground plane, a second photoelectric device provided with an optical system adapted to focus on said photoelectric device ambient radiation received through a narrow slit having a width equal to the width of said first slit and located at ground level parallel to said first slit and a short distance behind said home plate, said second optical system and said second photoelectric device located at ground level, said second optical system adapted to focus radiation on said photoelectric device striking said slit in a direction substantially perpendicular to the ground plane, a third photoelectric device provided with a third optical system adapted to focus on said photoelectric device ambient radiation received through a narrow slit having a width equal to the width of said first slit and located parallel thereto a short distance in front of said first slit at ground level, said optical system and said photoelectric device located below ground level, said optical system adapted to focus radiation on said photoelectric device striking said slit from a direction inclined to and intersecting said first and second directions in lines corresponding to knee and shoulder levels of said strike zones, means responsive to a one-three-two sequence of interruption of said radiation to said photoelectric devices corresponding to the passage of a ball through said strike zone.

15. Apparatus for determining whether the path of an object traversing a region in a given general direction is at a height substantially greater than or less than a predetermined value, comprising a first radiation sensitive device responsive only to overhead radiation along a first narrow beam, a second radiation sensitive device responsive only to overhead radiation along a second narrow beam, passage of said object through said beams being detected by said respective radiation sensitive devices, said devices being further positioned such that said beams intersect to form two diverging beams on opposite sides of said intersection, said intersection occurring at a height equal to said predetermined value so that passage of said object on one side of said intersection interrupts said beams in one sequence while passage on the other side of said intersection interrupts said beams in another sequence, and control means connected to said radiation sensitive devices operable upon the occurrence of a predetermined sequence of interruption.

WALTER HAUSZ.

References Cited in the file of this patent

UNITED STATES PATENTS

| Number | Name | Date |
|---|---|---|
| 2,037,191 | Backer | Apr. 14, 1936 |
| 2,048,740 | Geffcken | July 28, 1936 |
| 2,113,899 | Oram | Apr. 12, 1938 |
| 2,473,893 | Lyle | June 21, 1949 |